No. 679,105. Patented July 23, 1901.
H. A. BUCK.
PISTON FOR ROTARY ENGINES.
(Application filed Dec. 7, 1900.)
(No Model.) 2 Sheets—Sheet 1.
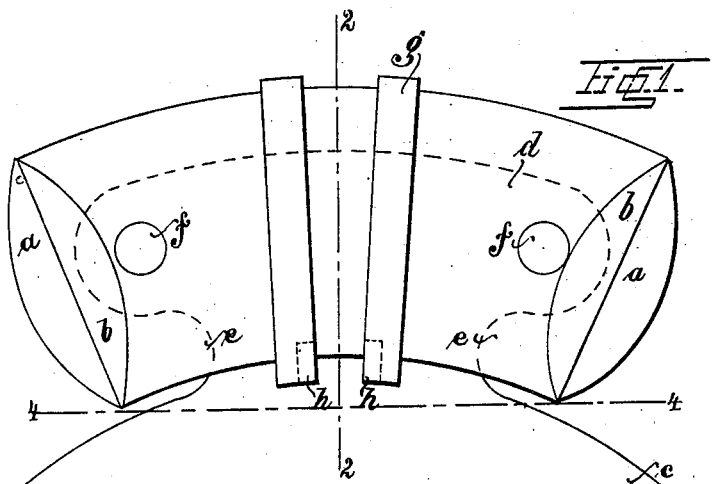
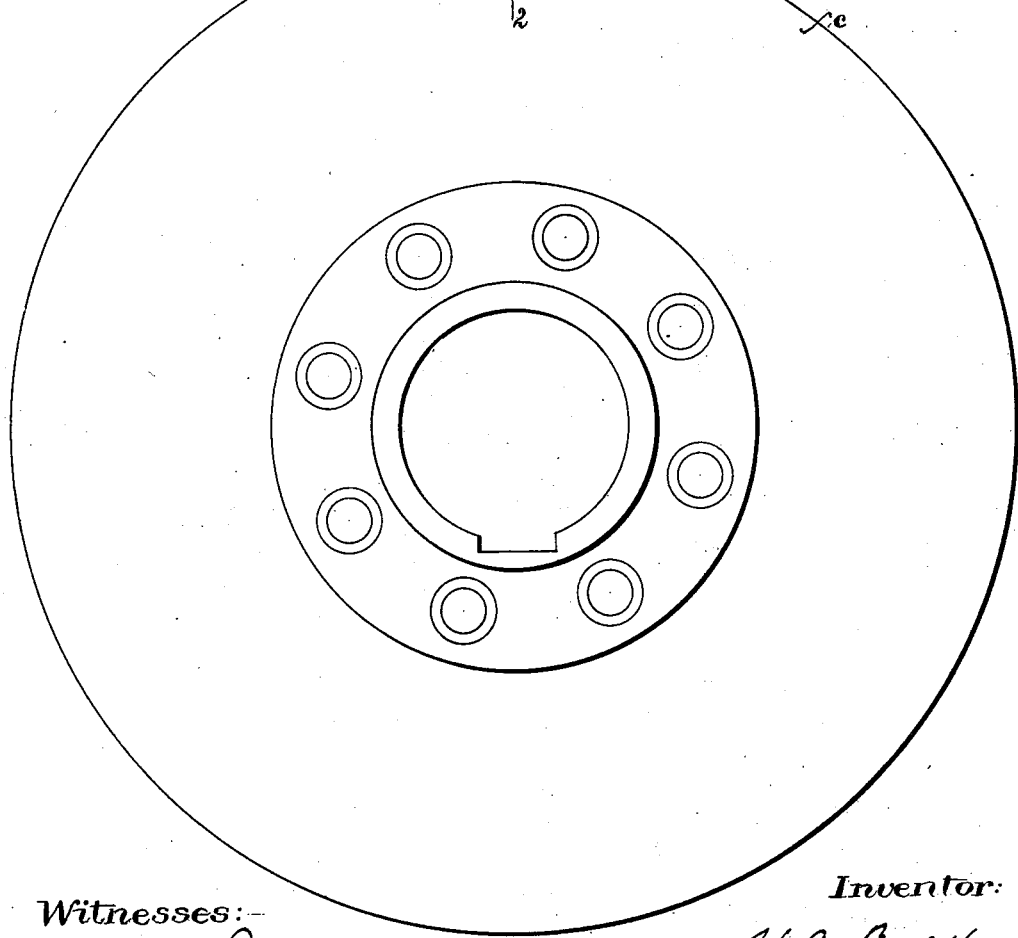
Witnesses:
Inventor:
H. A. Buck
by Wilkinson & Fisher
Attorneys.

No. 679,105. Patented July 23, 1901.
H. A. BUCK.
PISTON FOR ROTARY ENGINES.
(Application filed Dec. 7, 1900.)
(No Model.)
2 Sheets—Sheet 2.
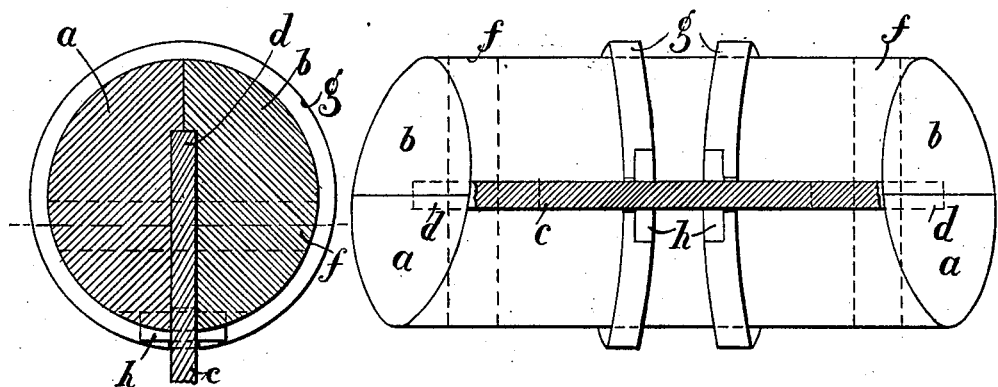
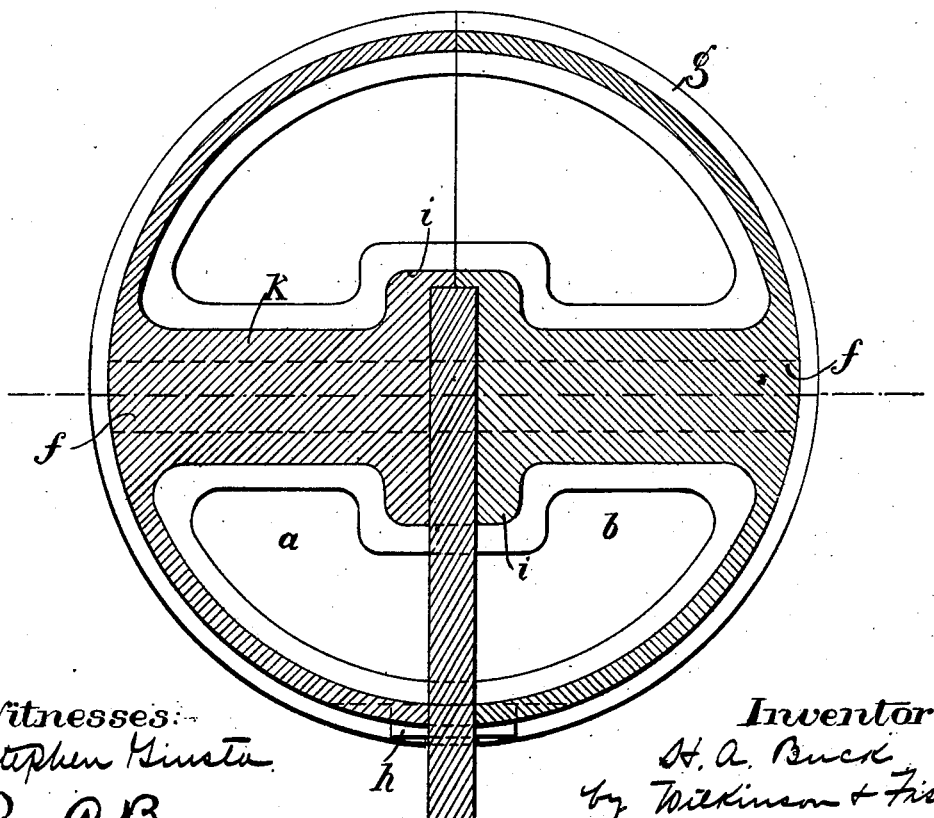

UNITED STATES PATENT OFFICE.

HENRY ALONZO BUCK, OF WEST STAFFORD, CONNECTICUT.

PISTON FOR ROTARY ENGINES.

SPECIFICATION forming part of Letters Patent No. 679,105, dated July 23, 1901.

Application filed December 7, 1900. Serial No. 39,079. (No model.)

*To all whom it may concern:*

Be it known that I, HENRY ALONZO BUCK, engineer, a citizen of the United States of America, and a resident of West Stafford, Connecticut, at present residing at Fruchtstrasse 37, in the city of Berlin, Germany, have invented new and useful Improvements in or Relating to Pistons for Rotary Engines, of which the following is a specification.

The present invention relates to a piston for rotary engines—that is to say, for such engines in which the piston is operated by steam in an annular space of cylindrical cross-section. The piston is secured to a plate, which in turn is mounted upon the shaft. Owing to the very high speed of such machines there is, in the first place, the construction of the piston to be carefully considered, so as to be in light and strong connection with the plate, and, further, to secure a thorough balancing of the piston, and, finally, to allow a rapid motion of the slide-plate, which enters the annular space behind the piston and is moved in such a manner as to allow the piston to pass by instantaneously.

In the accompanying drawings, Figure 1 is a side elevation of a piston according to my invention. Fig. 2 is a cross-section of the same. Fig. 3 represents a low-pressure piston; and Fig. 4 is an elevation of the piston viewed from below with the piston-plate in section, the view being taken on line 4 4 of Fig. 1.

The piston, which is shaped in accordance with the annular channel in which it works, consists of two symmetrical halves $a$ and $b$. The plate $c$, to which the piston is secured, is provided with a radial projection $d$, the shape of which is indicated by dotted lines in Fig. 1 of the drawings. It is to be remarked that the neck $e$ of the projection $d$ is not as wide as the head, so that the projection, which engages with similarly-shaped recesses in both piston parts, will prevent the piston from being forced off or outward in a radial direction.

The piston is mounted on the plate $c$ by placing the projection $d$ of the disk $c$ into the corresponding recess of the one half of the piston, whereupon the other piston half is placed in position on the other side of the projection $d$. Then the piston-rings are mounted, whereby the piston becomes solid and forms as a whole a closed body. The connection can be still further strengthened by suitable cross-bolts $f$.

The piston-rings $g$ are notched, and on the plate $c$ square pins $h$ are vertically arranged, against which the notched ends of the piston-ring tightly bear, but lie in such a manner that the necessary yielding action of the piston-rings is maintained.

As will be seen from Fig. 1, the front and rear ends of the piston are obliquely cut off for the purpose of enabling the slide-plate moving transversely in the annular space to begin its movement out of the piston-path before the arrival of the center line of the piston and, further, to move out the slide-path before the center of the piston moves by.

If the machine is provided with a high and low pressure cylinder, the piston of the latter is weighted or balanced so as to have the same momentum as the piston of the high-pressure cylinder. To this end it is generally made hollow, as shown in Fig. 3, while the method of securing it (represented in Fig. 1) can without difficulty be employed also in this case, inasmuch as each half of the piston is provided with only one middle rib $i$, in which the recess for receiving the projection $d$ is arranged. This rib $i$ can be connected by arms $k$ to the corresponding piston part. These arms can be made hollow or bored to serve at the same time for receiving the bolts $f$.

Having thus particularly described and ascertained the nature of my invention and how it is to be performed, I declare that what I claim is—

1. A rotary-steam-engine piston consisting of two symmetrical halves, each half being cut away, in combination with a plate provided with a projection adapted to fit into the cut-away portions of said halves, substantially as described.

2. A rotary-steam-engine piston consisting of two symmetrical halves arranged to be placed together face to face and each half having a part thereof cut away, in combination with a plate having a projection with a reduced neck, which projection and neck are adapted to fit into the cut-away portions of the two halves, substantially as described.

3. A rotary-steam-engine piston composed of two symmetrical halves adapted to fit together face to face, each half being provided with a rib and each rib having a cut-away portion, in combination with a carrying-plate adapted to fit into said cut-away portions, substantially as described.

4. A rotary-steam-engine piston composed of two symmetrical halves adapted to fit together face to face, each half being provided with arms extending longitudinally through said half and each arm being provided with ribs, and each half being provided with cut-away portions, in combination with a carrying-plate provided with a projection having a reduced neck said projection and neck being adapted to fit into the cut-away portions of said halves respectively, substantially as described.

5. A rotary-steam-engine piston provided with wear-rings, said piston and rings being notched, in combination with a notched carrying-plate and pins engaging said piston, rings and plate, substantially as described.

In testimony whereof I have signed my name to this specification in the presence of two subscribing witnesses.

HENRY ALONZO BUCK.

Witnesses:
HENRY HASPER,
WOLDEMAR HAUPT.